United States Patent [19]

Ishida et al.

[11] Patent Number: 5,370,809

[45] Date of Patent: * Dec. 6, 1994

[54] SYNTHETIC LUBRICATING OILS

[75] Inventors: Noboru Ishida; Tetsuro Sakamoto; Hiroshi Hasegawa, all of Yokohama, Japan

[73] Assignee: Nippon Oil Co., Ltd., Tokyo, Japan

[ * ] Notice: The portion of the term of this patent subsequent to Nov. 16, 2010 has been disclaimed.

[21] Appl. No.: 47,692

[22] Filed: Apr. 14, 1993

Related U.S. Application Data

[63] Continuation-in-part of Ser. No. 822,090, Jan. 17, 1992, abandoned.

[30] Foreign Application Priority Data

| Jan. 18, 1991 | [JP] | Japan | 3-018359 |
| Jan. 18, 1991 | [JP] | Japan | 3-018360 |
| Jan. 28, 1991 | [JP] | Japan | 3-25178 |
| Jan. 8, 1992 | [JP] | Japan | 4-018427 |
| Jan. 8, 1992 | [JP] | Japan | 4-018428 |

[51] Int. Cl.$^5$ .......................................... C10M 105/36
[52] U.S. Cl. .............................. 252/52 A; 252/56 S; 252/68; 558/266
[58] Field of Search ............... 252/52 A, 56 S, 68; 558/266, 267

[56] References Cited

U.S. PATENT DOCUMENTS

| 2,379,252 | 6/1945 | Muskat et al. | 558/266 |
| 4,072,704 | 2/1978 | Langdon | 558/266 |
| 4,975,212 | 12/1990 | Thomas et al. | 252/54 |
| 5,114,605 | 5/1992 | Mizui et al. | 252/68 |
| 5,185,092 | 2/1993 | Fukuda et al. | 252/56 S |
| 5,238,590 | 8/1993 | Mizui et al. | 252/52 A |
| 5,262,076 | 11/1993 | Ishida et al. | 252/52 A |

*Primary Examiner*—Prince Willis, Jr.
*Assistant Examiner*—James M. Silbermann
*Attorney, Agent, or Firm*—Bucknam and Archer

[57] ABSTRACT

A synthetic lubricating oil comprising as a base oil at least one kind of a carbonic acid ester represented by the general formula (1)

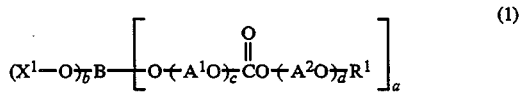

wherein all the symbols such as $X^1$, $A^1$, $A^2$, B, $R^1$, a, b, c and d are as defined in claim 1

17 Claims, No Drawings

SYNTHETIC LUBRICATING OILS

This application is a continuation-in-part of U.S. Ser. No. 822,090, filed Jan. 17, 1992, now abandoned, the priority of which is claimed under 35 U.S.C. 120.

BACKGROUND OF THE INVENTION

1. Field of the Invention

This invention relates to a synthetic lubricating oil and, more specifically, it relates to a synthetic lubricating oil which comprises a specific carbonic acid ester as a major component (a base oil) and is especially useful as a lubricating oil for refrigerators and the like (the oil being hereinafter referred to as "a refrigerator oil").

2. Prior Art

Generally, naphthenic mineral oils, paraffinic mineral oils, alkylbenzenes, polyglycolic oils and mixtures thereof, which have each a kinematic viscosity of 10–200 cSt at 40° C., as well as said oils incorporated with suitable additives, have been used as refrigerator oils.

On the other hand, chlorofluorocarbon type refrigerants (CFCS), such as CFC-11, CFC-12, CFC-115 and HCFC-22, have been used as such for refrigerators.

Of these CFCS, those such as CFC-11, CFC-12 and CFC-115, which are obtained by substituting all the hydrogen atoms of their hydrocarbons by halogen atoms including chlorine atoms, may lead to the destruction of the ozone layer, and, therefore, the use of the CFCS has been restricted. Accordingly, hydrogen-containing halogenocarbons, particularly chlorine-free type halogenocarbons such as HFC-32, HFC-134a and HFC-152a, have been being used as substitutes for CFCS. HFC-134a is especially hopeful as a substitute refrigerant since it is similar in thermodynamic properties to CFC-12 which has heretofore been used in many kinds of refrigerators for home cold-storage chests, air-conditioners, car air-conditioners and the like.

Refrigerator oils require various properties, among which their miscibility with refrigerants is extremely important in regard to lubricity and system of efficiency in refrigerators. However, conventional refrigerator oils comprising, as the base oils, naphthenic oils, paraffinic oils, alkylbenzenes and the like, are hardly miscible with chlorine-free type halogenocarbons such as HFC-32, HFC-134a. Therefore, if said conventional refrigerator oils are used in combination with HFC-134a, the resulting mixture will separate into two layers at normal temperature thereby to degrade the oil-returnability which is the most important within the refrigeration system and cause various troubles such as a decrease in refrigeration efficiency, deterioration of lubricity and the consequent seizure of the compressor within the system whereby the refrigerator oils are made unsuitable for use as such.

In attempts to solve such problems, the present inventors developed polyglycolic refrigerator oils which have excellent miscibility with HFC-134a as compared with conventional known refrigerator oils, filed an application for a patent for the thus developed polyglycolic refrigerator oils and have already obtained a patent (U.S. Pat. No. 4,948,525) therefor. Further, U.S. Pat. No. 4,755,316 discloses polyglycolic refrigerator oils which are compatible with HFC-134a.

The present inventors found that esters having specific structures have excellent miscibility with chlorine-free type halogenocarbons such as HFC-134a and a high electrical insulating property, and filed applications for patents for the esters (Japanese Patent Application Laid-Open Gazettes Nos. Hei. 3-200895 and Hei. 3-200896, and Japanese Patent Applications Nos. Hei. 2-105772 and Hei. 2-121133Hei. 1 and Hei. 2 are the same as 1989 and 1990 A.D., respectively.).

The known esters have various excellent properties as mentioned above, but they are hydrolyzable and therefore they are not necessarily suitable for use in apparatuses, such as cold-storage chests and car air-conditioners, which must be operated for a long period of time with high reliability. Accordingly, it has been desired to develop a refrigerator oil which has high miscibility with hydrogen-containing halogenocarbons such as HFC-32, HFC-134a, HFC-152a, and also has a high hydrolysis stability (or high stability to hydrolysis).

SUMMARY OF THE INVENTION

The present inventors made various intensive studies in attempts to develop lubricating oils which can meet the aforesaid requirements and, as the result of their studies, they found that carbonic acid esters having specific structures have excellent miscibility with hydrogen-containing halogenocarbons such as HFC-134a and HFC-152a, and a high electrical insulating property as well as excellent lubricity and excellent hydrolytic stability. This invention is based on this finding.

The object of this invention is to provide synthetic lubricating oils which comprise as a major component (or a base oil) at least one kind of carbonic acid ester having a specific structure, and have excellent miscibility with hydrogen-containing halogenocarbons such as HFC-134a, as well as excellent hydrolysis stability.

The synthetic lubricating oil of the present invention is characterized in that it comprises as a base oil at least one kind of a carbonic acid ester represented by the general formula (1)

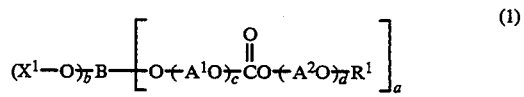

(this carbonic acid ester being hereinafter referred to as "carbonic acid ester (1)").

The carbonic acid esters (1) according to the present invention will be explained in detail as indicated below.

In the general formula (1), $X^1$ represents a member selected from the group consisting of a hydrogen atom, an alkyl group (preferably having 1-12 carbon atoms), a cycloalkyl group (preferably having 5-12 carbon atoms) or a group having the general formula of $R^2$—$(OA^3)_e$—; $A^1$, $A^2$ and $A^3$ may be identical with, or different from, each other and are each an alkylene group having 2-4 carbon atoms; $R^1$ and $R^2$ may be identical with, or different from, each other and are each a hydrogen atom, an alkyl group (preferably having 1-12 carbon atoms) or a cycloalkyl group (preferably having 5-12 carbon atoms); B represents the residue of a compound having 3-20 hydroxyl groups; a is an integer of 1-20, b is an integer of 0-19 and the sum of a and b equals 3-20; c and d are each an integer of 0-50 provided that c and d are not zero at the same time; and e is an integer of 1-50.

The alkylene groups having 2-4 carbon atoms, which are represented respectively by $A^1$, $A^2$ and $A^3$ are exemplified by ethylene group, propylene group, trimethylene group, butylene group, tetramethylene group, 1-methyltrimethylene group, 2-methyltrimethylene group, 1,1-dimethylethylene group and 1,2-dimethylethylene group.

The preferable alkyl groups represented respectively by $X^1$, $R^1$ and $R^2$ are exemplified by methyl group, ethyl group, n-propyl group, iso-propyl group, n-butyl group, iso-butyl group, sec.-butyl group, tert.-butyl group, n-pentyl group, iso-pentyl group, neopentyl group, n-hexyl group, iso-hexyl group, n-heptyl group, iso-heptyl group, n-octyl group, iso-octyl group, n-nonyl group, iso-nonyl group, n-decyl group, iso-decyl group, n-undecyl group, iso-undecyl group, n-dodecyl group and iso-dodecyl group. The preferable cycloalkyl groups are exemplified by cyclopentyl group, cyclohexyl group, cycloheptyl group, cyclooctyl group, cyclononyl group, cyclodecyl group, cycloundecyl group, cyclododecyl group, methylcyclohexyl group, ethylcyclohexyl group, propylcyclohexyl group, butylcyclohexyl group, pentylcyclohexyl group and hexylcyclohexyl group.

The compounds having 3-20 hydroxyl groups of which residue is B (these compounds being hereinafter referred to as "polyol compounds") are exemplified by polyhydric alcohols such as glycerin, polyglycerin (dimer to octadecamer of glycerin such as diglycerin, triglycerin and tetraglycerin), trimethylolethane. trimethylolpropane, trimethylolbutane, monopentaerythritol, dipentaerythritol, tripentaerythritol, 1,3,5-pentanetriol, sorbitol, sorbitan, sorbitol glycerin condensate, adonitol, arabitol, xylitol and mannitol; polyhydric phenols such as pyrogallol and phloroglucin; saccharides such as xylose, arabinose, ribose, rhamnose, glucose, fructose, galactose, mannose, sorbose, cellobiose, maltose, isomaltose, trehalose, sucrose, raffinose, gentianose and melezitose; and partially etherified compounds, partially esterified compounds and methyl glucoside (glycoside) derived from said saccharides. In this case, B may have free hydroxyl groups therein. This means that all of the hydroxyl groups in the polyol compounds may not be esterified.

In the polyoxyalkylene portion of the carbonic acid ester according to the present invention, alkylene groups having different carbon numbers and structures may be present in the molecule. In this case, the type of polymerizing the oxyethylene groups is not particularly limited, and it may be either random copolymerization or block copolymerization.

A method for producing the carbonic acid esters to be used in the present invention is not particularly limited. For example, the carbonic acid esters can be produced by addition reacting polyol compounds with alkylene oxides to produce polyalkylene glycol polyol ethers and reacting the thus obtained polyalkylene glycol polyol ethers with chloroformate having 2-13 carbon atoms in the presence of an alkali such as metallic sodium, an alkali metal hydroxide such as sodium hydroxide or potassium hydroxide, or an alkali metal alkoxyde such as sodium methoxyde and sodium ethoxyde potassium hydroxide at a temperature of from 0° to 30° C., or it can be produced by reacting a polyalkylene glycol polyol ether with a diester carbonate or phosgen, which is a source for supply of carbonic acid, in the presence of an alkali such as metallic sodium, an alkali metal hydroxide such as sodium hydroxide or potassium hydroxide, an alkali metal alkoxyde such as sodium methoxyde or sodium ethoxyde potassium hydroxide at a temperature of from 80° to 150° C. Then, free hydroxyl groups contained in the thus obtained carbonic acid esters may be etherified, as required.

The carbonic acid ester (1) obtained by the methods as mentioned above may be refined to remove the by-products and/or unreacted reactants, but the by-products and/or unreacted reactants may be present in small amounts in the lubricating oils of the present invention as far as they do not impair the excellent performances thereof.

In the preparation of the synthetic lubricating oils of the present invention, the carbonic acid ester (1) mentioned above may be used singly, or jointly as a mixture of at least two kinds of the esters.

The molecular weight of each of the carbonic acid ester (1) according to the present invention is not particularly limited, but, in a case where the carbonic acid ester is used as a refrigerator oil, the number average molecular weight of the carbonic acid ester is in the range of preferably 200-4000, more preferably 300-3000, to improve the compressor in sealability.

The kinematic viscosities of the carbonic acid ester (1) according to the present invention are in the range of preferably 2-150 cSt, more preferably 4-100 cSt at 100° C.

The lubricating oil of the present invention comprising as the only base oil at least one carbonic acid ester (1) represented by the general formula (1) has excellent properties, such as miscibility with refrigerants and hydrolysis resistance, but it preferably further comprises as the additional base oil at least one carbonic acid ester represented by the following general formula (2)

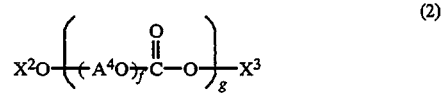
(2)

(this carbonic acid ester being hereinafter referred to as "carbonic acid ester (2)") to further improve viscosity-temperature properties, such as viscosity index, under the condition of maintaining the above miscibility with refrigerants and hydrolysis resistance at high levels.

The carbonic acid esters (2) will be explained in detail as indicated below.

In the general formula (2), $X^2$ represents a member selected from the group consisting of a hydrogen atom, an alkyl group (preferably having 1-12 carbon atoms), a cycloalkyl group (preferably having 5-12 carbon atoms) or a group having a general formula of

$X^3$ represents a member selected from the group consisting of an alkyl group, a cycloalkyl group (preferably having 5-12 carbon atoms) or a group having a general formula of $-(A^5O)_h-R^4$, $A^4$ and $A^5$ may be identical with, or different from, each other and are each an alkylene group having 2-4 carbon atoms (with the proviso that the alkylene groups necessarily include an ethylene group or ethylene groups), $R^3$ represents an alkyl group (preferably having 1-12 carbon atoms) or cycloalkyl group (preferably having 5-12 carbon atoms), $R^4$ represents a hydrogen atom, an alkyl group (preferably having 1-12 carbon atoms) or a cycloalkyl group (preferably having 5-12 carbon atoms), f and h are each an integer of 1-50 and g is an integer of 1-10.

The alkyl groups represented by each of $X^2$, $X^3$, $R^3$ and $R^4$ are exemplified by methyl group, ethyl group, n-propyl group, n-butyl group, n-pentyl group, n-hexyl group, n-heptyl group, n-octyl group, n-nonyl group, n-decyl group, n-undecyl group, n-dodecyl group, iso-propyl group, iso-butyl group, tert.-butyl group, iso-pentyl group, iso-hexyl group, iso-heptyl group, iso-octyl group, iso-nonyl group, iso-decyl group, iso-undecyl group and iso-dodecyl group. Further, the cycloalkyl groups are exemplified by cyclopentyl group, cyclooctyl group, cyclononyl group, cyclodecyl group, cycloundecyl group, cyclohexyl group, cycloheptyl group, cyclododecyl group, methylcyclohexyl group, ethylcyclohexyl group, propylcyclohexyl group, butylcyclohexyl group, pentylcyclohexyl group and hexylcyclohexyl group.

The alkylene groups having 2-4 carbon atoms represented respectively by $A^4$ and $A^5$ are exemplified by ethylene group, propylene group, trimethylene group, butylene group, tetramethylene group, 1-methyl trimethylene group, 2-methyl trimethylene group, 1,1-dimethylethylene group, 1,2-dimethylethylene group with the proviso that the carbonic acid ester (2) of polyalkylene glycol of the present invention necessarily contains at least one ethylene group in the polyalkylene portion thereof. The carbonic acid ester (2) of polyalkylene glycol containing ethylene groups therein is remarkably improved in solubility in the HFC-134a refrigerant carrier as compared with the conventional polyalkylene glycol and alkyl ethers thereof. The amount of ethylene group contained in the polyalkylene group is normally not larger than 60% by weight preferably 10 to 50% by weight, based on the total amount of the alkylene groups. The type polymerizing oxyethylene group with another oxyalkylene group is not particularly limited, and it may be either random copolymerization or block copolymerization.

A method for producing the carbonic acid esters (2) is not particularly limited. For example, the carbonic acid esters (2) can be produced by polymerizing an alkylene oxide to produce a polyalkylene glycol and reacting the thus obtained polyalkylene glycol with chloroformate having 2-13 carbon atoms in the presence of an alkali such as metallic sodium, an alkali metal hydroxide such as sodium hydroxide or potassium hydroxide, or an alkali metal alkoxyde such as sodium methoxide or sodium ethoxyde at a temperature of from 0° to 30° C., or it can be produced by reacting a polyalkylene glycol with a diester carbonate or phosgen, which is a source for supply of carbonic acid, and an alcohol having 1-12 carbon atoms in the presence of an alkali such as metallic sodium, an alkali metal hydroxide such as sodium hydroxide or potassium hydroxide, an alkali metal alkoxyde such as sodium methoxyde or sodium ethoxyde at a temperature of from 80° to 150° C.

The carbonic acid ester (2) obtained by the methods as mentioned above may be refined to remove the by-products and/or unreacted reactants, but the by-products and/or unreacted reactants may be present in small amounts in the lubricating oils of the present invention as far as they do not impair the excellent performances thereof.

In the preparation of the synthetic lubricating oils of the present invention, the carbonic acid ester (2) mentioned above may be used singly, or jointly as a mixture of at least two kinds of the esters.

The molecular weight of each of the carbonic acid ester (2) according to the present invention is not particularly limited, but, in a case where the carbonic acid ester (2) is used as a refrigerator oil, the number average molecular weight of the carbonic acid ester (2) is in the range of preferably 200-4000, more preferably 300-3000, to improve the compressor in sealability.

The kinematic viscosities of the carbonic acid ester (2) according to the present invention are in the range of preferably 2-150 cSt, more preferably 4-100 cSt at 100° C.

In a case where the lubricating oil of the present invention comprises as the base oils the carbonic acid ester (1) represented by the general formula (1) together with the carbonic acid ester (2) represented by the general formula (2), the content of each of the carbonic acid esters is not particularly limited, but the content of the carbonic acid ester (1) and that of the carbonic acid ester (2) are preferably 50-99% by weight and 50-1% by weight, more preferably 60-95% by weight and 40-5% by weight, based on the total amount of the mixture of the base oils, respectively.

The lubricating oil of the present invention may comprise as the only base oil at least one member selected from the above carbonic acid esters (1) or a mixture of the carbonic acid esters (1) and (2) and, as required, it may additionally comprise other base oils for lubricating oils. The other base oils will be illustrated hereinafter. For example, mineral oils usable as the other base oils are exemplified by paraffinic or naphthenic base oils which are produced by subjecting lubricating oil fractions obtained by atmospheric distillation or reduced pressure distillation of a crude oil, to a suitable combination of refining treatments such as solvent deasphalting, solvent extraction, hydrocracking, solvent dewaxing, catalytic dewaxing, hydrorefining, sulfuric acid treatment and clay treatment. Further, the synthetic oils usable as the other base oils are exemplified by poly alpha-olefins such as polybutene, 1-octene oligomers and 1-decene oligomers; alkylbenzenes; alkylnaphthalenes; diesters such as ditridecyl glutarate, di 2-ethylhexyl adipate, diisodecyl adipate, ditridecyl adipate and di 3-ethylhexyl sebacate; polyol esters such as trimethylolpropane caprylate, trimethylolpropane pelargonate, pentaerythritol 2-ethyl hexanoate and pentaerythritol pelargonate; polyalkylene glycols; polyphenyl ethers; silicone oils; perfluoro alkylethers; and mixtures of at least two kinds of the synthetic oils. In a case where the other base oils are to be incorporated in the carbonic acid ester (1) or the carbonic acid esters (1) and (2), it is desirable that the carbonic acid ester (1) or the carbonic acid esters (1) and (2) be present therein in a ratio of not less than 20% by weight, preferably not less than 50% by weight, more preferably not less than 70% by weight of the total amount of the other base oils and the carbonic acid esters.

In a case where the lubricating oil of the present invention is to be used as a refrigerator oil, the lubricating oil may comprise as the only base oil at least one member selected from the above carbonic acid esters (1) or a mixture of the carbonic acid esters (1) and (2) and, as required, it may additionally comprise other base oils for refrigerator oils.

Among the other base oils which are conventional ones, preferable ones are illustrated by polyglycols such as polyoxyalkylene glycols, polyoxyalkylene glycol monoethers, polyoxyalkylene glycol diethers and polyoxyalkylene glycol glycerol ethers; complex esters of a monohydric alcohol, a dihydric alcohol, a monocarboxylic acid and a dicarboxylic acid; esters of a neopentyl type polyol such as pentaerythritol, trimethylolpropane or a dimer or trimer thereof and an carboxylic acid; complex esters of a neopentyl type polyol, a monocarboxylic acid and a dicarboxylic acid; and carbonic acid esters other than carbonic acid esters (1) and (2) according to the present invention.

These conventional base oils may be incorporated singly or jointly, and are desired to be incorporated in an amount of not more than 80% by weight, preferably not more than 70% by weight, more preferably not more than 50% by weight of the total amount of the lubricating oil according to the present invention.

Further, the carbonic acid ester (1) or the carbonic acid esters (1) and (2) according to the present invention may be incorporated with other oils such as paraffinic mineral oils, naphthenic mineral oils, polyα-olefins and alkylbenzenes, but, in this case, these other oils may desirably be incorporated in an amount of not more than 30% by weight, preferably not more than 20% by weight, of the total amount of the lubricating oils since these other oils are poor in miscibility with hydrogen-containing halogenocarbon refrigerants.

To further enhance the lubricating oil of the present invention in excellent performances, the lubricating oil may be incorporated, as required, with heretofore known additives for lubricating oils. The additives are exemplified by antioxidants such as phenol-type ones, amine-type ones, sulfur-type ones, zinc thiophosphate-type ones and phenothiazine-type ones; wear resistant additives such as molybdenum dithiophosphate, molybdenum dithiocarbamate, molybdenum disulfide, carbon fluorides, boric esters, aliphatic amines, higher alcohols, higher fatty acids, fatty acid esters and fatty acid amides; extreme pressure agents such as tricresyl phosphate, triphenyl phosphate and zinc dithiophosphate; corrosion inhibitors such as petroleum sulfonates, alkylbenzene sulfonates and dinonylnaphthalene sulfonates; metal inactivators such as benzotriazole; metallic detergents such as alkaline earth metal sulfonates, alkaline earth metal phenates, alkaline earth metal salicylates and alkaline earth metal phosphonate; ash-free dispersants such as succinimide, succinate esters and benzylamine; antifoaming agents such as silicone; viscosity index improvers such as polymethacrylate, polyisobutylene and polystyrene; and pour point depressants. These additives may be used singly or jointly. The contents of the viscosity index improver, the antifoaming agent, the metal inactivator and each of the other additives are ordinarily 1–30% by weight, 0.0005–1% by weight, 0.005–1% by weight and 0.1–15% by weight of the total amount of the lubricating oil, respectively.

In a case where the lubricating oil of the present invention is to be used as a refrigerator oil, the lubricating oil may be incorporated further with at least one kind of a phosphorus compound selected from the group consisting of phosphoric esters, acid phosphoric esters, amine salts of acid phosphoric esters, chlorinated phosphoric esters and phosphorous esters, to improve the oil in wear resistance and load resistance. These phosphorus compounds are esters of phosphoric acid or phosphorous acid and an alkanol or a polyether type alcohol, or derivatives of the esters. The phosphoric esters are exemplified by tributyl phosphate, triphenyl phosphate and tricresyl phosphate. The acid phosphoric esters are exemplified by ditetradecyl acid phosphate, dipentadecyl acid phosphate, dihexadecyl acid phosphate, diheptadecyl acid phosphate and dioctadecyl acid phosphate. The amine salts of acid phosphoric esters are exemplified by salts of the above acid phosphoric esters and amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine. The chlorinated phosphoric esters are exemplified by tris.dichloropropyl phosphate, tris.chloroethyl phosphate, polyoxyalkylene-bis[di(chloroalkyl)] phosphate and tris.chlorophenyl phosphate. The phosphorous esters are exemplified by dibutyl phosphite, tributyl phosphite, dipentyl phosphite, tripentyl phosphite, dihexyl phosphite, trihexyl phosphite, diheptyl phosphite, triheptyl phosphite, dioctyl phosphite. trioctyl phosphite, dinonyl phosphite, didecyl phosphite, diundecyl phosphite, triundecyl phosphite, didodecyl phosphite, tridodecyl phosphite, diphenyl phosphite, triphenyl phosphite, dicresyl phosphite, tricresyl phosphite and mixtures thereof. These phosphorous compounds may be added to the lubricating oil in a ratio of 0.1–5.0% by weight, preferably 0.2–2.0% by weight, of the total amount of the lubricating oil.

In a case where the lubricating oil of the present invention is to be used as a refrigerator oil, to further improve the lubricating oil in stability, it may be incorporated with at least one kind of an epoxy compound selected from the group consisting of phenylglycidyl ether type epoxy compounds, glycidyl ester type epoxy compounds, epoxidized fatty acid monoesters and epoxidized vegetable oils. The said phenylglycidyl ether type epoxy compounds used herein include phenylglycidyl ether and alkylphenylglycidyl ethers. The said alkylphenylglycidyl ethers are those having 1 to 3 alkyl groups having 1 to 13 carbon atoms, among which are preferred those having an alkyl group having 4 to 10 carbon atoms, such as butylphenylglycidyl ether, pentylphenylglycidyl ether, hexylphenylglycidyl ether, heptylphenylglycidyl ether, octylphenylglycidyl ether, nonylphenylglycidyl ether and decylphenylglycidyl ether. The said glycidyl ester type epoxy compounds include phenylglycidyl esters, alkylglycidyl esters and alkenylglycidyl esters, with glycidyl benzoate, glycidyl acrylate, glycidyl methacrylate and the like being preferred.

The epoxidized fatty acid monoesters include esters of an epoxidized fatty acid having 12 to 20 carbon atoms and an alcohol having 1 to 8 carbon atoms, phenol or an alkylphenol. In particular, butyl, hexyl, benzyl, cyclohexyl, methoxyethyl, octyl, phenyl, or butylphenyl esters of epoxidized stearic acid may preferably be used.

The epoxidized vegetable oils include epoxidized compounds of vegetable oils such as soybean oil, linseed oil and cottonseed oil.

Among these epoxy compounds, the preferable ones include phenylglycidyl ether type epoxy compounds and epoxidized fatty acid monoesters with the former being more preferable. The most preferred are phenylglycidyl ether, butylphenylglycidyl ether and mixtures thereof.

In a case where these epoxy compounds are to be incorporated in the lubricating oil of the present invention, it is desirable that they be incorporated therein in a ratio of 0.1–5.0% by weight, preferably 0.2–2.0% by weight, of the total amount of the lubricating oil.

Furthermore, in a case where the lubricating oil of the present invention is to be used as a refrigerator oil, to further improve the lubricating oil in wear resistance and load resistance, it may be incorporated with a carboxylic acid represented by the general formula (3)

$$R^5-CH(COOH)_2 \quad (3)$$

and/or the general formula (4)

$$R^6-CH_2-COOH \quad (4)$$

wherein $R^5$ and $R^6$ may be identical with, or different from, each other and are each an alkyl group having 8-18 carbon atoms. The above carboxylic acids are exemplified by octylmalonic acid, nonylmalonic acid, decylmalonic acid, undecylmalonic acid, dodecylmalonic acid, tridecylmalonic acid, tetradecylmalonic acid, pentadecylmalonic acid, hexadecylmalonic acid, heptadecylmalonic acid, octadecylmalonic acid, decanoic acid, undecanoic acid, lauric acid, tridecanoic acid, myristic acid, pentadecanoic acid, palmitic acid, heptadecanoic acid, stearic acid, nonadecanoic acid, eicosanoic acid and mixtures of at least two kinds of the above carboxylic acids. In a case where these carboxylic acids are to be incorporated in the lubricating oil of the present invention, it is desirable that they be incorporated therein in a ratio of 0.01-3% by weight, preferably 0.05-2% by weight, of the total amount of the lubricating oil.

To further enhance the lubricating oil of the present invention in wear-lowering performance, the lubricating oil may be incorporated with monohydric alcohols having 7-8 carbon atoms, dihydric alcohols having 7-18 carbon atoms and/or partial esters of polyhydric alcohols having 7-18 carbon atoms.

The monohydric alcohols having 7-18 carbon atoms are exemplified by octyl, nonyl, decyl, undecyl, dodecyl, tridecyl, tetradecyl, pentadecyl, hexadecyl, heptadecyl, octadecyl, oleyl and linoleyl alcohols, and mixtures of at least two alcohols mentioned above. The dihydric alcohols having 7-18 carbon atoms are exemplified by polymethylene diol. The partial esters of polyhydric alcohols having 7-18 carbon atoms are exemplified by partial esters of a polyglycerin and a fatty acid.

In a case where these compounds are to be incorporated in the lubricating oil of the present invention, it is desirable that they be incorporated therein in a ratio of 0.01-3.0% by weight, preferably 0.05-2.0% by weight, of the total amount of the lubricating oil.

Of course, at least two kinds of the aforementioned phosphorus compounds, epoxy compound, carboxylic acids, alcohols and partial esters of polyhydric alcohols having 7-18 carbon atoms may be used jointly.

In a case where the lubricating oil of the present invention is to be used as a refrigerator oil, to further enhance the lubricating oil in performances, the lubricating oil may be incorporated, as required, with heretofore known additives for a refrigerator oil, which include phenol-type antioxidants such as di-tert.-butyl-p-cresol and bisphenol A; amine-type antioxidants such as phenyl-α-naphthylamine and N,N-di(2-naphthyl)-p-phenylenediamine; wear resistant additives such as zinc dithiophosphate; extreme pressure agents such as chlorinated paraffin and sulfur compounds; oiliness improvers such as fatty acids; antifoaming agents such as silicone-type ones; and metal inactivators such as benzotriazole. These additives may be used singly or jointly. The total amount of these additives added is ordinarily not more than 10% by weight, preferably not more than 5% by weight, of the total amount of the lubricating oil.

In a case where conventional refrigerator oils and/or additives are to be incorporated in the carbonic acid ester (1) or the carbonic acid esters (1) and (2) according to the present invention, it is desirable that the carbonic acid ester (1) or the carbonic acid esters (1) and (2) be incorporated in the resulting lubricating oil in a ratio of not less than 5% by weight, preferably not less than 10% by weight, more preferably not less than 50% by weight, most preferably not less than 70% by weight, of the total amount of the lubricating oil.

In a case where the lubricating oil of the present invention comprising at least one kind of the carbonic acid esters (1) or a mixture of the carbonic acid esters (1) and (2) as a major component is to be used as a refrigerator oil, the lubricating oil should have such viscosity and pour point as those which are normally suitable for an ordinary refrigerator oil, but it should desirably have a pour point of not higher than $-10°$ C., preferably $-20°$ C. to $-80°$ C., to prevent it from solidification at a low temperature. Further, the viscosity of the lubricating oil of the present invention may suitably be selected depending on the use thereof, but the lubricating oil should desirably have a kinematic viscosity of not less than 2 cSt, preferably not less than 3 cSt at 100° C., to keep the sealability of the compressor of the refrigerator when used, while it should desirably have a kinematic viscosity of not more than 150 cSt, preferably not more than 100 cSt at 100° C., in view of its fluidity at a low temperature and the efficiency of heat exchange in the evaporator when used.

The refrigerants which may be used in refrigerators in which the lubricating oils of the present invention are suitably used as refrigerator oils, include hydrogen-containing halogenocarbons such as pentafluoroethane (HFC-125), 1,1,2,2-tetrafluoroethane (HFC-134), 1,1,1,2-tetrafluoroethane (HFC-134a), 1,1-difluoroethane (HFC-152a), difluoromethane (HFC-32), trifluoromethane (HFC-23), monochlorodifluoromethane (HCFC-22) or 1-chloro-1,1-difluoroethane (HCFC-142b), dichlorotrifluoroethane (HCFC-123), monochlorotetrafluoroethane (HCFC-124); hydrogen-free halogenocarbons such as trichloromonofluoromethane (CFC-11), dichlorodifluoromethane (CFC-12), monochlorotrifluoromethane (CHC-13) and monochloropentafluoromethane (CFC-115); and mixtures of at least two of the halogenocarbons. Among these halogenocarbons, the hydrogen-containing halogenocarbons are preferable with chlorine-free type halogenocarbons such as HFC-32, HFC-23, HFC-125, HFC-134, HFC-134a and HFC-152a being particularly preferable in view of the environmental problems. The most preferred is HFC-134a.

The lubricating oils of the present invention are very excellent in miscibility with the hydrogen-containing halogenocarbons, particularly chlorine-free type halogenocarbons, as compared with the heretofore known lubricating oils.

The lubricating oils of the present invention may particularly preferably be used as refrigerator oils in air-conditioners, dehumidifiers, cold-storage chests, freezers, freeze and refrigeration warehouses, automatic vending machines, showcases, cooling units in chemical plants, and the like which have a reciprocating or rotary compressor. Further, the above lubricating oils may also preferably be used in refrigerators having a centrifugal compressor. Further, the lubricating oils of the present invention may preferably be used as not only the refrigerator oils, but also engine oils, gear oils, hydraulic oils, metal processing oils and the other industrial lubricating oils.

The present invention will be better understood by the following Examples and Comparative Examples, but the present invention is not limited to the embodiments described in the Examples.

EXAMPLES 1–22 and COMPARATIVE EXAMPLES 1–6

Lubricating oils of the present invention and comparative lubricating oils of conventional types are illustrated as follows:

EXAMPLE 1

A refrigerator oil comprising a carbonic acid ester having an average molecular weight of 1800 represented by the following formula:

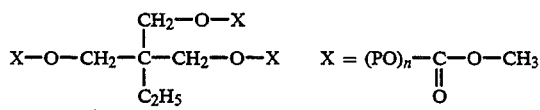

wherein $(PO)_n$ is a polyoxypropylene group.

EXAMPLE 2

A refrigerator oil comprising a carbonic acid ester having an average molecular weight of 1600 represented by the following formula:

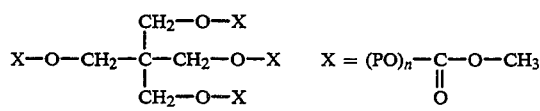

wherein $(PO)_n$ is a polyoxypropylene group.

EXAMPLE 3

A refrigerator oil comprising a carbonic acid ester having an average molecular weight of 2000 represented by the following formula:

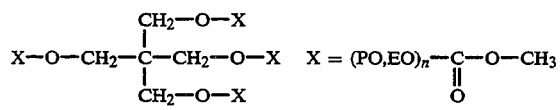

wherein $(PO, EO)_n$ is a random copolymer of oxypropylene groups and oxyethylene groups with the proviso that the weight ratio of the oxypropylene groups : the oxyethylene groups is 50:50.

EXAMPLE 4

A refrigerator oil comprising a carbonic acid ester having an average molecular weight of 2500 represented by the following formula:

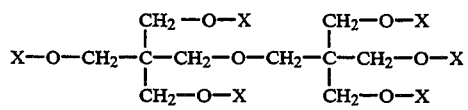

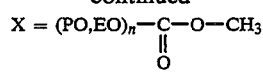

wherein $(PO, EO)_n$ is a random copolymer of oxypropylene groups and oxyethylene groups with the proviso that the weight ratio of the oxypropylene groups : the oxyethylene groups is 50:50.

EXAMPLE 5

A refrigerator oil comprising a carbonic acid ester having an average molecular weight of 1000 represented by the following formula:

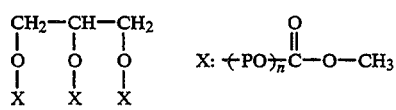

wherein $(PO)_n$ is a polyoxypropylene group.

EXAMPLE 6

A refrigerator oil comprising a carbonic acid ester having an average molecular weight of 2000 represented by the following formula:

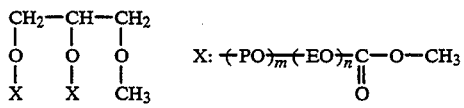

wherein $(PO)_m—(EO)_n$ is a random copolymer of polyoxypropylene groups and poly oxyethylene groups with the proviso that the weight ratio of the polyoxypropylene groups : the poly oxyethylene groups is 90:10.

EXAMPLE 7

A refrigerator oil comprising a carbonic acid ester having an average molecular weight of 2000 represented by the following formula:

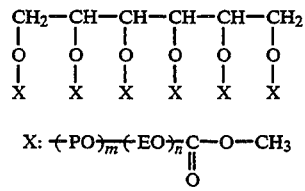

wherein $(PO)_m—(EO)_n$ is a random copolymer of polyoxypropylene groups and poly oxyethylene groups with the proviso that the weight ratio of the polyoxypropylene groups : the poly oxyethylene groups is 90:10.

EXAMPLE 8

A refrigerator oil comprising a carbonic acid ester having an average molecular weight of 2000 represented by the following formula:

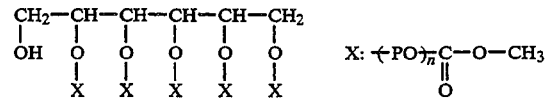

wherein $(PO)_n$ is a polyoxypropylene group.

EXAMPLE 9

A refrigerator oil comprising a carbonic acid ester having an average molecular weight of 1000 represented by the following formula:

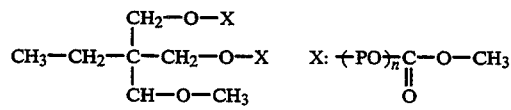

wherein $(PO)_n$ is a polyoxypropylene group.

EXAMPLE 10

A refrigerator oil comprising a carbonic acid ester having an average molecular weight of 2000 represented by the following formula:

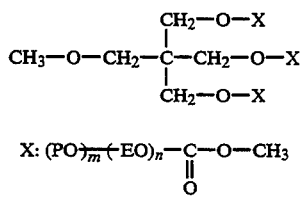

wherein $(PO)_m$—$(EO)_n$ is a random copolymer of polyoxypropylene groups and poly oxyethylene groups with the proviso that the weight ratio of the polyoxypropylene groups: the poly oxyethylene groups is 90:10.

EXAMPLE 11

A refrigerator oil comprising a carbonic acid ester having an average molecular weight of 2000 represented by the following formula:

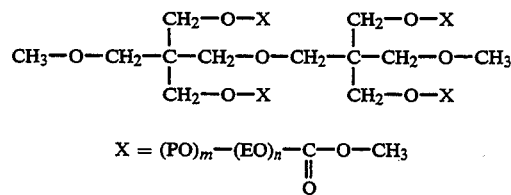

wherein $(PO)_m$—$(EO)_n$ is a random copolymer of polyoxypropylene groups and poly oxyethylene groups with the proviso that the weight ratio of the polyoxypropylene groups: the poly oxyethylene groups is 50:50.

EXAMPLE 12

A refrigerator oil comprising a carbonic acid ester of a polyglycerin alkylether having a number average molecular weight of 2100 represented by the following formula:

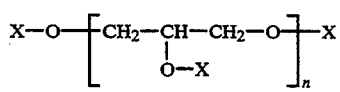

wherein each of X is —$CH_2$—$C(CH_3)H$—O—$CH_3$ or —$CH_2$—$C(CH_3)H$—O—CO—O—$CH_3$ with the proviso that the molar ratio of the former: the latter is 50:50, and n is a number average value of 11.3.

EXAMPLE 13

A refrigerator oil comprising a carbonic acid ester having an average molecular weight of 1000 represented by the following formula:

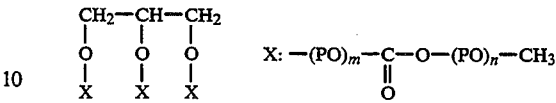

wherein $(PO)_m$ and $(PO)_n$ are each a polyoxypropylene group.

EXAMPLE 14

A refrigerator oil comprising a carbonic acid ester having an average molecular weight of 2000 represented by the following formula:

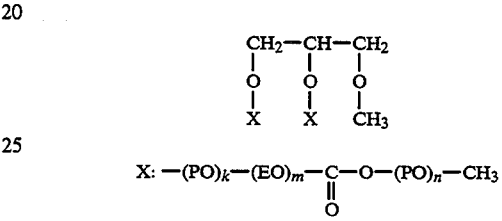

wherein $(PO)_k$—$(EO)_m$ is a random copolymer of polyoxypropylene groups and polyoxyethylene groups with the proviso that the weight ratio of the polyoxypropylene groups: the poly oxyethylene groups is 90:10, and $(PO)_n$ is a polyoxypropylene group.

EXAMPLE 15

A refrigerator oil comprising a carbonic acid ester having an average molecular weight of 2000 represented by the following formula:

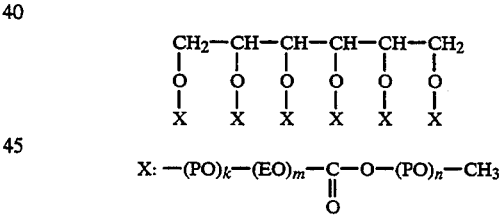

wherein $(PO)_k$—$(EO)_m$ is a random copolymer of polyoxypropylene groups and polyoxyethylene groups with the proviso that the weight ratio of the polyoxypropylene groups: the poly oxyethylene groups is 90:10, and $(PO)_n$ is a polyoxypropylene group.

EXAMPLE 16

A refrigerator oil comprising a carbonic acid ester having an average molecular weight of 2000 represented by the following formula:

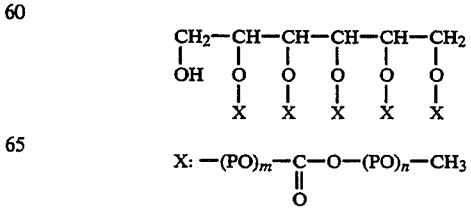

wherein $(PO)_m$ and $(PO)_n$ are each a polyoxypropylene group.

EXAMPLE 17

A refrigerator oil comprising a carbonic acid ester having an average molecular weight of 1000 represented by the following formula:

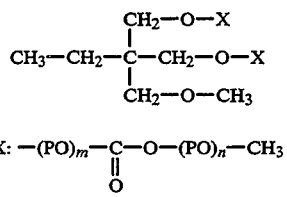

$$X: -(PO)_m-\underset{\underset{O}{\|}}{C}-O-(PO)_n-CH_3$$

wherein $(PO)_m$ and $(PO)_n$ are each a polyoxypropylene group.

EXAMPLE 18

A refrigerator oil comprising a carbonic acid ester having an average molecular weight of 2000 represented by the following formula:

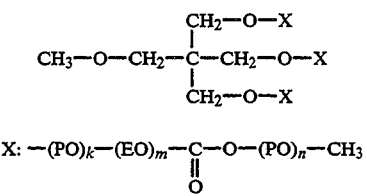

$$X: -(PO)_k-(EO)_m-\underset{\underset{O}{\|}}{C}-O-(PO)_n-CH_3$$

wherein $(PO)_k-(EO)_m$ is a random copolymer of polyoxypropylene groups and polyoxyethylene groups with the proviso that the weight ratio of the polyoxypropylene groups: the poly oxyethylene groups is 90:10, and $(PO)_n$ is a polyoxypropylene group.

EXAMPLE 19

A refrigerator oil comprising a carbonic acid ester having an average molecular weight of 2200 represented by the following formula:

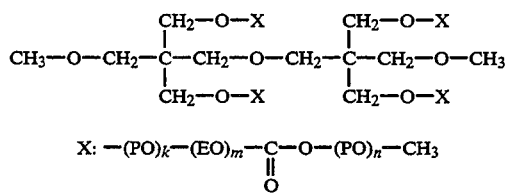

$$X: -(PO)_k-(EO)_m-\underset{\underset{O}{\|}}{C}-O-(PO)_n-CH_3$$

wherein $(PO)_k-(EO)_m$ is a random copolymer of polyoxypropylene groups and polyoxyethylene groups with the proviso that the weight ratio of the polyoxypropylene groups: the poly oxyethylene groups is 50:50, and $(PO)_n$ is a polyoxypropylene group.

EXAMPLE 20

A refrigerator oil comprising a carbonic acid ester having an average molecular weight of 2400 represented by the following formula:

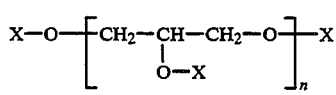

-continued $$X: -(PO)_k-(EO)_m-\underset{\underset{O}{\|}}{C}-O-(PO)_n-CH_3$$

wherein $(PO)_k-(EO)_m$ is a random copolymer of polyoxypropylene groups and polyoxyethylene groups with the proviso that the weight ratio of the polyoxypropylene groups: the poly oxyethylene groups is 80:20, and $(PO)_n$ is a polyoxypropylene group.

EXAMPLE 21

A refrigerator oil comprising 80 parts by weight of the same carbonic acid ester as that in Example 8 and 20 parts by weight of a carbonic acid ester having an average molecular weight of 2000 represented by the following formula:

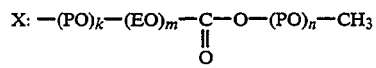

wherein $(PO,EO)_n$ is a random copolymer of oxypropylene groups and oxyethylene groups with the proviso that the weight ratio of the oxypropylene groups: the oxyethylene groups is 50:50.

EXAMPLE 22

A refrigerator oil comprising 70 parts by weight of the same carbonic acid ester as that in Example 16 and 30 parts by weight of a carbonic acid ester having an average molecular weight of 2000 represented by the following formula:

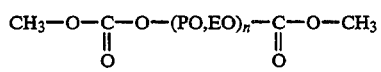

wherein $(PO)_m$ and $(PO)_n$ are each a polymer of oxypropylene groups and each of m and n is about 17.

Comparative Example 1

A naphthenic mineral oil

Comparative Example 2

A branched-chain type alkylbenzene (average molecular weight: about 480)

Comparative Example 3

A tetraester of pentaerythritol, 2-methyl-hexanoic acid and 2-ethyl-hexanoic acid

Comparative Example 4

Polyoxypropylene glycol (average molecular weight: about 1000)

Comparative Example 5

Polyoxypropylene glycol monobutyl ether (average molecular weight: about 2000)

Comparative Example 6

Polyoxypropylene oxyethylene glycol dimethyl ether (average molecular weight: about 2000)

The base oils of Examples 1–22 for the lubricating oils of the present invention were evaluated for their performances that were their miscibility with HFC-134a, hydrolysis resistance, and wear resistance by the following respective test methods. For comparison, the mineral oil, the alkylbenzene, the ester oil and the polyoxyalkylene glycols of the Comparative Examples 1-6 which have heretofore been used as lubricating oil were evaluated in the same manner as in Examples 1-22.

(Miscibility with HFC-134a)

0.2 g of the test oil of each of the Examples and the Comparative Examples and 2.0g of the refrigerant (HFC-134a) were sealed in a glass tube having an inner diameter of 6 mm and a length of 220mm. The glass tubes so sealed were placed in a thermostat maintained at a predetermined low temperature and then in a thermostat kept at a predetermined high temperature to observe whether the refrigerant and the test oil were miscible with each other, separated from each other or made white-turbid.

(Hydrolysis test)

Sixty grams (60 g) of each of the test oils and 0.6 g of water were introduced in a 200-ml glass test tube and copper, iron and aluminum plates (6cm$^2$) were then placed therein as deterioration accelerating catalysts, after which the whole in the tube was heated to 175° C. for 168 hours in an autoclave made of stainless steel thereby to thermally deteriorate the test oils.

After the test, each of the test oils was measured for acid value and hydroxyl value.

(FALEX wear test)

The test oils were each applied to a test journal for measuring the amount of the test journal worn by having the journal run in at a test oil temperature of 100° C. under a load of 150 lb for 1 minute and then running it under a load of 250 lb for 2 hours in accordance with ASTM D 2670.

lubricating oils of Comparative Examples 1-6. Particularly, the carbonic acid ester oils of the present invention are excellent in miscibility with a refrigerant, HFC-134a, as compared with even the polyalkylene glycols of Comparative Examples 4-6 which have been known as lubricating oils having excellent miscibility with the HFC-134a refrigerant. Further, the FALEX wear test shows that the lubricating oils of Examples 1-22 are at least equal in wear resistance to those of Comparative Examples 1-2 and 4-6.

Table 1 also shows that the ester oil of Comparative Example 3 is inferior in hydrolysis stability whereby it will raise some problems as to corrosion by acids formed when used in a refrigerator system in which external moisture is expected to enter into the system and mix with the oil, while the lubricating oils of Examples 1-22 will not raise any problems because of no formation of acids although they are somewhat hydrolyzable and form hydroxyl groups when used in such a refrigerator system as above.

(Effect of the Invention)

As is apparent from the above comparative experiments, the lubricating oils of the present invention are excellent in miscibility with refrigerants, hydrolysis resistance and wear resistance, and are suitable for use in refrigerators using therein a hydrogen-containing halogenocarbon as a refrigerant. They can therefore be preferably used particularly as a refrigerator oil.

What is claimed is:

1. A synthetic lubricating oil comprising as a base oil at least one carbonic acid ester having a number average molecular weight of 200-4,000, of formula (1)

TABLE 1

| Example* Comparative Example | Kinematic viscosity at 100° C. (cSt) | Viscosity index | Miscibility with HFC-134a Miscible temperature range (°C.) | Hydrolysis resistance (mg KOH/g) Acid value | Hydroxyl value | Falex test Amount of journal worn (mg) |
|---|---|---|---|---|---|---|
| Example 1 | 20.5 | 105 | <−70-60 | 0.05 | 2.4 | 25 |
| Example 2 | 19.8 | 103 | <−70-59 | 0.06 | 2.0 | 24 |
| Example 3 | 20.6 | 105 | <−70-62 | 0.05 | 3.5 | 27 |
| Example 4 | 30.1 | 99 | <−70-72 | — | *2.0 | 20 |
| Example 5 | 12.0 | 152 | <−70-81 | 0.06 | 2.5 | 22 |
| Example 6 | 23.2 | 130 | <−70-62 | 0.06 | 2.1 | 24 |
| Example 7 | 28.4 | 100 | <−70-68 | 0.04 | 3.9 | 28 |
| Example 8 | 29.5 | 60 | <−70-65 | 0.05 | *3.1 | 30 |
| Example 9 | 11.7 | 46 | <−70-83 | 0.04 | 3.4 | 24 |
| Example 10 | 22.6 | 115 | −65-71 | 0.06 | 2.5 | 21 |
| Example 11 | 31.5 | 102 | −35-65 | 0.15 | 4.5 | 19 |
| Example 12 | 30.2 | 113 | <−70-74 | 0.03 | 2.4 | 20 |
| Example 13 | 11.5 | 148 | <−70-75 | 0.04 | 2.8 | 23 |
| Example 14 | 27.1 | 125 | <−70-68 | 0.04 | 2.5 | 27 |
| Example 15 | 32.2 | 92 | <−70-71 | 0.05 | 3.8 | 30 |
| Example 16 | 28.4 | 54 | −68-66 | 0.03 | *3.3 | 30 |
| Example 17 | 10.9 | 38 | −70-80 | 0.06 | 3.1 | 24 |
| Example 18 | 28.1 | 44 | −65-70 | 0.06 | 2.0 | 25 |
| Example 19 | 35.2 | 100 | −35-63 | 0.13 | 3.9 | 20 |
| Example 20 | 32.9 | 108 | −65-70 | 0.03 | 2.5 | 20 |
| Example 21 | 27.0 | 124 | <−70-63 | 0.04 | 3.0 | 28 |
| Example 22 | 25.5 | 135 | <−70-59 | 0.03 | 2.9 | 25 |
| Comp. Ex. 1 | 21.5 | −8 | Immiscible | — | — | 20 |
| Comp. Ex. 2 | 22.0 | 0 | Immiscible | — | — | 22 |
| Comp. Ex. 3 | 5.2 | 88 | −45->80 | 9.5 | 11.3 | 16 |
| Comp. Ex. 4 | 23.4 | 186 | −45-32 | — | — | 25 |
| Comp. Ex. 5 | 37.9 | 200 | −52-19 | — | — | 25 |
| Comp. Ex. 6 | 24.8 | 201 | <−70-45 | — | — | 27 |

*Difference between the hydroxyl values measured before thermal deterioration of the oil and measured after the deterioration thereof.

It is apparent from the results indicated in Table 1 that the lubricating oils (Examples 1-22) of the present invention are very excellent in miscibility with a refrigerant, HFC-134a, as compared with the conventional

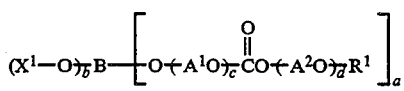
(1)

wherein $X^1$ is a member selected from the group consisting of a hydrogen atom, an alkyl group, a cycloalkyl group or a group having the formula $R^2$—$OA^3)_e$—, $A^1$, $A^2$ and $A^3$ are identical or different from each other and are each an alkylene group having 2-4 carbon atoms, $R^1$ and $R^2$ are identical or different from each other and are each a hydrogen atom, an alkyl group or a cycloalkyl group, B represents the residue of a compound having 3-20 hydroxyl groups, a is an integer of 1-20, b is an integer of 0-19, and the sum of a and b equals an integer of 3-20, c and d are each an integer of 0-50 with the proviso that c and d are not both zero and e is an integer of 1-50.

2. The lubricating oil according to claim 1 wherein said carbonic acid ester (1) has a number average molecular weight of 300-3,000 and the kinematic viscosity is 2-150 cSt.

3. The synthetic lubricating oil according to claim 1, wherein the base oil is a mixture of:
(i) at least one said carbonic acid ester of formula (1), and
(ii) at least one carbonic acid ester of formula (2)

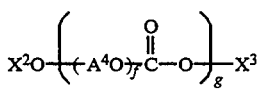
(2)

wherein $X^2$ is a member selected from the group consisting of hydrogen atom, an alkyl group, a cycloalkyl group and a group having the formula

$X^3$ is a member selected from the group consisting of an alkyl group, a cycloalkyl group or a group having the formula of —$(A^5O)_h$—$R^4$, $A^4$ and $A^5$ are identical or different from each other and are each an alkylene group having 2-4 carbon atoms, with the proviso that said alkylene groups include at least one ethylene group, $R^3$ represents an alkyl group or cycloalkyl group, $R^4$ represents a hydrogen atom, an alkyl group or a cycloalkyl group, f and h are each an integer of 1-50 and g is an integer of 1-10.

4. A synthetic lubricating oil according to claim 3 wherein said at least carbonic acid ester (i) is present in an amount of 50-99% by weight and said at least one carbonic acid ester (ii) is present in an amount of 50-1% by weight each based on the total amount of said base oil.

5. The synthetic lubricating oil according to claim 3 wherein said carbonic acid ester of formula (2) has number average molecular weight 200-4,000 and the kinetmetric viscosity is 2-150 cSt.

6. The synthetic lubricating oil according to claim 1, wherein the base oil is a mixture of:
(i) at least said one carbonic acid ester of formula (1), and
(iii) at least one oil selected from the group consisting of (1) polyoxyalkylene glycols, polyoxyalkylene glycol monoethers, polyoxyalkylene glycol diethers and polyoxyalkylene glycol glycerol ethers, and (2) complex esters of a monohydric alcohol, a dihydric alcohol, a monocarboxylic acid and a dicarboxylic acid, (3) esters of a polyol which is pentaerythritol, trimethylolpropane, a dimer or a trimer thereof and a carboxylic acid, (4) complex esters of polyol which is pentaerythritol, trimethylolpropane, a dimer or a trimer thereof; a monocarboxylic acid and a dicarboxylic acid, and (5) carbonic acid esters having a structure different from the structure of said ester of formula (1).

7. The synthetic lubricating oil according to claim 6 wherein said oil (iii) is present in an amount of not more than 80% by weight based on the total amount of the synthetic lubricating oil.

8. The synthetic lubricating oil according to claim 1 further comprising at least one phosphorus compound selected from the group consisting of phosphoric esters, acid phosphoric esters, amine salts of acid phosphoric esters, chlorinated phosphoric esters and phosphorous esters, in an amount of 0.1-5.0% by weight based on the total amount of said synthetic lubricating oil.

9. A synthetic lubricating oil according to claim 1, further comprising at least one epoxy compound selected from the group consisting of phenylglycidyl ethers, alkylphenylglycidyl ethers; phenyl glycidyl esters, alkylglycidyl esters and alkenylglycidyl esters; epoxidized fatty acid monoesters and epoxidized vegetable oils, in an amount of 0.1-5.0% by weight based on the total amount of said synthetic lubricating oil.

10. A synthetic lubricating oil according to claim 1, further comprising at least one carboxylic acid of formula

and formula

wherein $R^5$ and $R^6$ are identical or different from each other and are each an alkyl group having 8-18 carbon atoms in an amount of 0.01-3% by weight based on the total amount of the synthetic lubricating oil.

11. The synthetic lubricating oil according to claim 1, further comprising at least one monohydric alcohol of 7-18 carbon atoms, a dihydric alcohol of 7-18 carbon atoms and a partially esterified polyhydric alcohol having 7-18 carbon atoms in an amount of 0.01-3% by weight based on the total amount of the synthetic lubricating oil.

12. The synthetic lubricating oil according to claim 3 wherein the base oil is a mixture of:
(i) at least said one carbonic acid ester of formula (1):
(ii) at least said one carbonic acid ester of formula (2), and
(iii) at least oil selected from the group consisting of (1) polyoxyalkylene glycol monoethers, polyoxyalkylene glycol diethers and polyoxyalkylene glycol glycerol ethers, and (2) complex esters of a monohydric alcohol, a dihydric alcohol, a monocarboxylic acid and a dicarboxylic acid, (3) esters of a polyol which is pentaerythritol , trimethylolpropane, a dimer or trimer thereof and a carboxylic acid, (4) complex esters of a polyol which is pentaerythritol, trimethylolpropane, a dimer or trimer thereof and a carboxylic acid, a monocarboxylic acid and a dicarboxylic acid, and (5) carbonic acid esters having a structure different from the structure of said carbonic acid esters of formulas (1) and 2).

13. A synthetic lubricating oil according to claim 12, wherein said oil (iii) is in an amount of not more than 80% by weight based on the total amount of the synthetic lubricating oil.

14. A synthetic lubricating oil according to claim 12, further comprising at least a phosphorus compound selected from the group consisting of phosphoric esters, acid phosphoric esters, amine salts of acid phosphoric esters, chlorinated phosphoric esters and phosphorous esters, in an amount of 0.1–5.% by weight based on the total amount of said synthetic lubricating oil.

15. A synthetic lubricating oil according to claim 3, further comprising at least one epoxy compound selected from the group consisting of phenylglycidyl ethers, alkylphenylglycidyl ethers; phenylglycidyl esters, alkylglycidyl esters and alkenylglycidyl esters, epoxidized fatty acid monoesters, epoxidized vegetable oils, in an amount of 0.1–5.0% by weight based on the total amount of the synthetic lubricating oil.

16. The synthetic lubricating oil according to claim 3 further comprising at least one carboxylic acid of formula $$R^5-CH(COOH)_2$$

and formula $$R^6-CH_2COOH$$

wherein $R^5$ and $R^6$ are identical, different from each other and are each an alkyl group having 8–18 carbon atoms in an amount of 0.01–3% by weight based on the total amount of the synthetic lubricating oil.

17. A synthetic lubricating oil according to claim 3, further comprising at least one monohydric alcohol, dihydric alcohol and partially esterified polyhydric alcohol having 7–18 carbon atoms, in an amount of 0.01–3% by weight based on the total amount of said synthetic lubricating oil.

* * * * *